United States Patent
Sonawane

(10) Patent No.: US 11,196,839 B1
(45) Date of Patent: Dec. 7, 2021

(54) SYSTEM AND METHOD FOR CLASSIFYING API REQUESTS IN API PROCESSING SYSTEMS USING A TREE CONFIGURATION

(71) Applicant: Google LLC, Mountain View, CA (US)

(72) Inventor: Ajit Sonawane, Bangalore (IN)

(73) Assignee: Google LLC, Mountain View, CA (US)

(*) Notice: Subject to any disclaimer, the term of this patent is extended or adjusted under 35 U.S.C. 154(b) by 278 days.

(21) Appl. No.: 15/587,645

(22) Filed: May 5, 2017

Related U.S. Application Data

(63) Continuation of application No. 14/262,709, filed on Apr. 26, 2014, now Pat. No. 9,667,704.

(51) Int. Cl.
*H04L 29/08* (2006.01)
*H04L 12/44* (2006.01)

(52) U.S. Cl.
CPC ............ *H04L 67/327* (2013.01); *H04L 12/44* (2013.01); *H04L 67/02* (2013.01)

(58) Field of Classification Search
CPC ........ H04L 67/327; H04L 12/44; H04L 67/02
USPC ......................................................... 709/203
See application file for complete search history.

(56) References Cited

U.S. PATENT DOCUMENTS

| | | | |
|---|---|---|---|
| 6,629,127 B1 | 9/2003 | Deen | |
| 6,725,281 B1* | 4/2004 | Zintel | ................. H04L 12/2803 709/217 |
| 6,978,271 B1 | 12/2005 | Hoffman et al. | |
| 7,774,380 B2 | 8/2010 | Burke et al. | |
| 7,882,138 B1 | 2/2011 | Kumar | |
| 8,224,829 B2 | 7/2012 | Pauly et al. | |
| 9,146,787 B2 | 9/2015 | Zhu et al. | |
| 2003/0167355 A1* | 9/2003 | Smith | ....................... G06F 8/20 719/328 |
| 2004/0267749 A1 | 12/2004 | Bhat et al. | |
| 2005/0015220 A1 | 1/2005 | Ramchandi | |
| 2008/0208979 A1* | 8/2008 | Vishwanath | ...... H04L 29/12594 709/206 |
| 2010/0180011 A1 | 7/2010 | Sood | |
| 2013/0238805 A1 | 9/2013 | Catrein et al. | |
| 2015/0007199 A1* | 1/2015 | Valeva | .................... G06F 9/546 719/313 |

* cited by examiner

*Primary Examiner* — Brian Whipple
*Assistant Examiner* — John Fan
(74) *Attorney, Agent, or Firm* — Lerner, David, Littenberg, Krumholz & Mentlik, LLP

(57) ABSTRACT

A method and system is provided for classifying one or more application processing interface (API) requests in an API processing system. The method includes receiving a client request comprising at least one API language component. The method also includes mapping a client request to a tree configuration, wherein the tree contains a plurality of nodes. The method further includes traversing the nodes of the tree to fetch information pertaining to one or more portions of the client request.

18 Claims, 4 Drawing Sheets

SYSTEM AND METHOD FOR CLASSIFYING API REQUESTS IN API PROCESSING SYSTEMS USING A TREE CONFIGURATION

CROSS-REFERENCE TO RELATED APPLICATION

This application is a continuation of U.S. application Ser. No. 14/262,709, filed Apr. 26, 2014, the contents of which are hereby incorporated by reference.

FIELD OF THE INVENTION

The present invention generally relates to API processing systems, and more particularly to classifying API requests in API processing systems using a tree configuration.

BACKGROUND OF THE INVENTION

An Application Program Interface (API) is a programming language format used by an application program to communicate with an operating system or other control programs such as a database management system (DBMS) or communications protocol. An API typically includes a library of components such as routines, protocols and tools for building software applications. The components may be software functions and processes such as executable code or scripts. In the case of "Web APIs", the APIs may be exposed over a network such as in a web page or desktop application that access API over the Internet. Most operating environments such as Windows, Unix, Linux, or like systems provide API components so that developers can run and execute applications consistent with the operating environment.

APIs allow developers to create application software (i.e. "apps") which can communicate directly with a particular operating system or computer platform by integrating functions from the operation system's API library into the application software. The term app can refer to mobile applications that utilize APIs. Developers may implement apps in various programming languages using various platforms. Therefore, APIs enable app developers to easily access and reuse application logic built by other developers.

More recently, developers may use a software development kit (SDK or devkit) to build applications and APIs for operating systems and/or platforms. An API platform may be a type of application that runs on a SDK acting as a means for communication between servers and one or more web APIs, generic HTTP services, or applications. Such an API platform application can be implemented as a set of configuration files and software code which rely on resources provided by the SDK.

In addition, web based APIs may be provided to developers in order to integrate services between two or more HTTP enabled services. These combined services may be referred to as a "mashup." For example, Housingmaps.com is a mashup that applies real estate information, such as apartments for rent or homes for sale from craigslist.com to Google Maps. The mashup results in a system that allows the user to sort apartments and homes by price and location onto an interactive map, allowing for efficient browsing of housing options.

A web service may be a type of API or software system which involves communication over a network. A web service may operate over HTTP or alternate transports such as SMTP. When running integrated web services in an API ecosystem, a Representational State Transfer (REST) is a commonly used architecture. In REST architecture, application functionality is divided into resources. A resource is an object with a type, associated data, relationships to other resources, and a set of methods that operate on it, where the resource is identified by a Uniform Resource Identifier (URI). Interactions with REST resources may include specifying the resource with a Uniform Resource Locator (URL) path, passing the resource one or more parameters, and issuing standard operations on the resource including POST, PUT, DELETE, and GET for adding, modifying, deleting and retrieving a resource, respectively in a Hypertext Transfer Protocol (HTTP) channel.

In REST and other interfaces for interfacing between web application services, delivering targeted content to a client based on client's request is time consuming and substantially costly due to the API platform needing potential traversal of an entire database of API groups or categories in order to fetch requisite information pertaining to each API developer request. Thus, there is a need for an API ecosystem that reduces the complexity of searching a database of API information in order to classify an API request. It is therefore desirable to offer a system and method to obtain information pertaining to an API request in a manner that provides improved efficiency in classification of API requests over traditional implementations.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to one embodiment of the present invention, a method for classifying one or more application program interface (API) requests in an API processing system is provided. The method includes receiving a client request comprising at least one API language component. The method further includes mapping a client request to a tree configuration, wherein the tree contains a plurality of nodes. The method also includes traversing said nodes of the tree in order to fetch information pertaining to one or more portions of the client request.

According to another embodiment of the present invention, an application program interface (API) analytics system for classifying one or more application program interface (API) requests in an API processing system is provided. The system includes an API gateway receiving a client request comprising at least one API language component. The system further includes a processor mapping a client request to a tree configuration, wherein the tree contains a plurality of nodes and traversing said nodes of the tree in order to fetch information pertaining to one or more portions of the client request.

These and other aspects, objects, and features of the present invention will be understood and appreciated by those skilled in the art upon studying the following specification, claims, and appended drawings.

DETAILED DESCRIPTION

Figure 1:
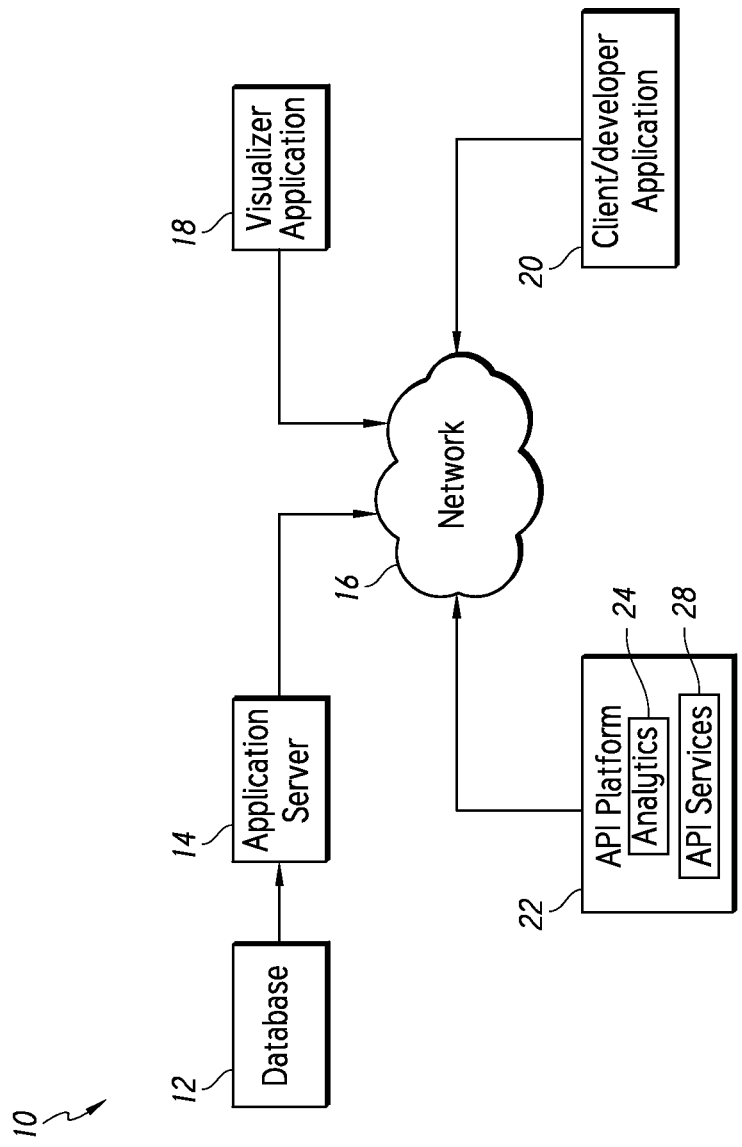
FIG. 1 illustrates a block diagram of an API system that monitors and controls API traffic, provides a platform for an API proxy deployment and provides many more features according to an illustrative embodiment of the invention.

FIG. 1 is a block diagram of an API system 10 including an API platform 22 that monitors and controls access of "API Entities" according to an illustrative embodiment of the invention. "Entities" may be any elements or actors which are part of the API ecosystem 10 including users, applications, devices, network between devices and the API platform, components of the API platform, backend services, and the network between the API platform and the backend service, etc. The system 10 includes a database 12 containing API entity information, application server 14, network 16, visualizer application 18, client/developer application 20, and the API platform 22 with analytics monitor/control 24. The system 10 may also include remote developer systems and user controlled devices such as a mouse and keyboard. The visualizer application 18 may include a graphical user interface (GUI) such as a web browser.

In the preferred embodiment, the API platform 22 (a system that may monitor and control the distribution of one or more API entities based on one or more constraints) may receive requests to access system 10 from developers via a client application 20. Once a request is accepted, the API platform 22 may communicate with application server 14 to retrieve requested API information from database 12. The API platform 22 may then retrieve requests from client application 20 to server 14 and return responses from server 14 back to the client application 20. Thus, the API platform 22 may provide the artifice that the client application 20 is communicating directly with a remote server 14. In one embodiment, the API platform 22 acts as an entryway for developers to access API information from database 12. During these communications and subsequent ones between server 14 and client application 20, the API platform 22 may gather information regarding the traffic of the APIs including usage rates, origins of request (e.g. IP addresses or URL), kinds of API calls, frequency of the API calls, and so forth.

The system 10 may allow web systems to make their services available on network 16 so that their services may be consumed by developer apps 20 running on mobile devices and desktops. For example, a service provider may wish to share their services 12 that provide product pricing, availability information, sales and ordering services across system 10. In some embodiments, server 14 and client 20 employ applications employing asynchronous JavaScript+ XML (Ajax) and other technologies using asynchronous loading and content presentation techniques, for example SHTML, document object model (DOM), JavaScript. Web based applications may use web protocols including services oriented access protocol (SOAP) and representational state transfer (REST). A service provider may share their services in database 12 as a set of HTTP endpoints in communication with application server 14. Client app developers may then make HTTP requests via Client/developer application 20 to these endpoints. Depending on the endpoint, application server may then return data formatted as XML or JSON back to developer application 20. The client created apps 20 which consume these services can be implemented as standalone applications of mobile devices or tables such as HTML5 applications running in a web browser, or any other type of application that can make a request to the HTTP endpoint and consume response data. Such client applications 20 may be developed and released by the same provider which shares their services 12 on system 10, or by a third party application developer who makes use of publicly available services. Application server 14 may include a server running Web 2.0 application or the like. Connected and in communication with system 10 may be a device capable of running a browser that supports Web 2.0 such as a cell phone, laptop, and the like. Web applications running on server 14 may use server-side dynamic content generation such as CGI, PHP, ASP or Java servlets, for example.

In addition, the API platform 22 may function as a mapping of publicly available HTTP endpoint to a company's web page backend service (e.g. ESB, SOA, App Servers). Since app developers may make HTTP requests to the API platform 22, rather than directly to the service provider's services, developers need not know the specifics of implementing such services. The developer may simply need to know the URL of the API platform endpoint, query parameters, heads or body parameters passed in the request, and any required authentication and authorization credentials of system 10. In addition, developer may need to know the HTTP response information including response data format such as XML or JSON. Therefore, the API platform 22 may isolate app developer and developer application 20 from the backend service. This allows service providers to move services to a new host or make any other changes to the service implementation. In addition, the API platform 22 allows for adding increased functionality to the API platform 22 without making changes to the backend service. For example, service providers may add policies to the API platform 22 to perform data transformations, filtering, added security, execute conditional logic or custom code, and the like.

In another embodiment, system 10 may provide developer services for API creation and development of client applications 20. A service provider may choose to build API proxies using APIs, SDKs and other convenience services as an app developer. Application server 14 may provide the necessary tools for adding and configuring API proxies, setting up API products, and managing developers and client applications 20. Thus, server 14 may offload many common management concerns from backend services.

In some embodiments, when API traffic is detected during exchanges between the application server 14 and client/ developer application 20, the API platform 22 may collect entity information related to these communications to analyze changes in traffic. Such analysis may be useful to take corrective actions, which may be controlled by user, may include blocking certain users from access, adding more processing bandwidth, revoking developer keys, rerouting traffic or implementing additional diagnostic changes, and the like. As data passes through the API platform 22, the API platform 22 collects the API's data including API call information (URL, IP, and user ID), latency, errors and so forth. The data may be gathered into trend charts and tables throughout an API Platform UI. The user may use this data to monitor the health of the API program and health of individual API.

In some embodiments, visualizer 18 may include internet browser software and the API platform 22 may be configured as a server capable of interpreting web protocols that may be used by visualizer 18 and client application 20. For example, such protocols may include Hypertext Transfer Protocol (HTTP), File Transfer Protocol (FTP), Telnet, and Secure Sockets Layer (SSL) and so forth.

The foregoing embodiments of system 10 may be realized as a software component operative within an operating system such as, without limitation, Windows or Unix or Linux. In such an embodiment, the API platform 22 can be implemented in a high level computing language such as C, C++, Fortran, or Java or Visual BASIC. In addition, script based programs may be used such as PHP, WML, and so forth.

In preferred embodiments, the analytics services 24 in communication with visualizer 18 provides tools to observe short and long term usage trends for API entities in the API Ecosystem 10. As data passes through the API platform 22, several types of information may be collected such as URL, IP, user ID for API call information, latency, and error data. In addition, developers may create programs called "policies" to add additional information, such as headers, query parameters, portions of a request or response extracted from XML or JSON.

Analytics services 24 may collect and analyze, in real time, several kinds of information that flow through APIs in network 16 such as URL, IP, user ID for API call information, latency, and error data. The data analysis may include determining API traffic trends over time, top developers, when API response time is fastest, geographically where API traffic is highest. Such continuous data analysis may help service providers improve their APIs, troubleshoot problems and make better business decisions with their API program such as how much API traffic capacity may be needed in the future. API data may be sorted using a query parameter as part of a request by client or service provider. The parameter may enable filtering of statistics for a list of API entities that enable a particular condition (e.g. top developer as measured by throughput or worst performers as measured by target API latency). Query parameters may define attributes of chosen dimension used to calculate statistics (metrics), calculations run against the metric defined for the dimension (functions), time intervals over which data should be analyzed (time ranges) and attributes used to simply or sort across results (filters). A client/developer may access metrics via a visualization API which can automate certain analytics functions, such as retrieving metrics periodically using an automation client or script.

In a preferred embodiment, analytics services 24 within the API platform 22 may provide several statistical units which may help to take the corrective actions such as security control, traffic restriction and performance control. Security control analysis may limit future spikes or drops in traffic by revoking and/or regulating access of developer keys or blocking access of IP addresses detected as causing spikes or drops in API traffic. Security control may involve limiting access of one or more API developer keys or IP addresses to certain API entities or functions. For example, the API platform application 22 may regulate access to an API due to an identified IP address of API call or geographical location of the API call or header in the call signifying a particular developer. In another embodiment, the API platform 22 may provide enhanced security and encryption.

Enhanced security may include cryptographic authentication, message integrity checking, encryption, and other like services. The security may include protocols such as IPSEC and IKE. The encryption may include DES AES, RSA and other public key or private key systems.

The API platform 22 may provide traffic restriction. The traffic restriction may limit future spikes or drops in traffic by turning off access to APIs from a developer's account once a threshold of API requests from a developer's account has been detected. Such a predetermined threshold may be a number of API calls by an IP address or developer account counted by a counter in system 10 within a predetermined time frame, e.g. 12 hours. Once this predetermined threshold is met, traffic restriction may turn off access of API entities by the IP address or developer account. In addition, if the threshold of API calls is met, the traffic restriction may limit future access of API entities such as controlling the number of times and API can be accessed by a given developer application 20.

Figure 2:
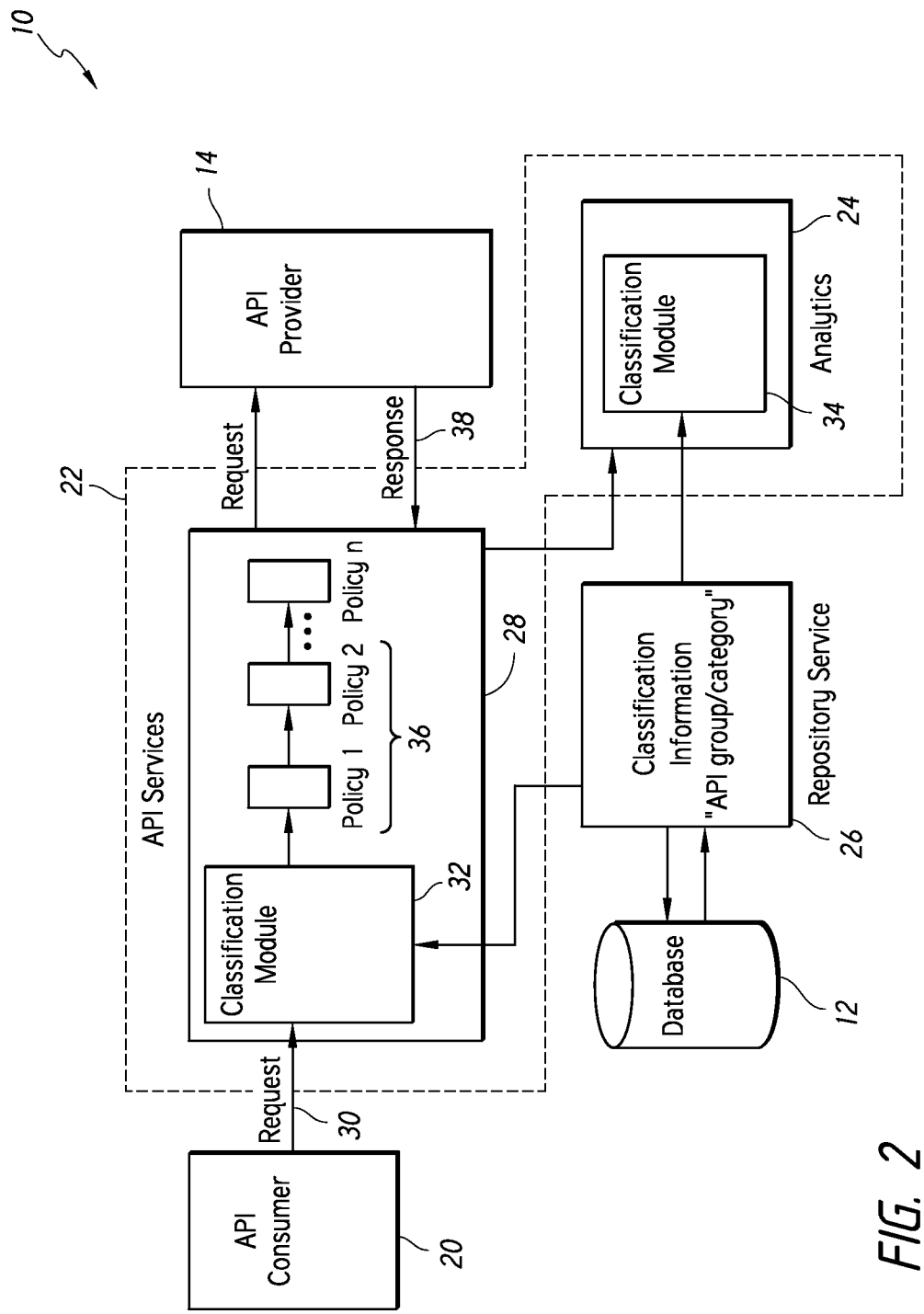
FIG. 2 illustrates a block diagram of an API system including an API services module with classification module for navigation of a tree configuration according to an illustrative embodiment of the invention.

FIG. 2 is a block diagram of an API system including an API services module 28 with classification module 32 for navigation of a tree configuration in accordance with a preferred embodiment. In system 10, an API services server 28 may receive a request in the form of a Representational State Transfer (REST) API architecture from a client/developer application 20 connected via a network 16. The requests 30 may originate from any set of client devices connected to network 16. The API request may be executed from a plurality of web browsers such as but not limited to Internet Explorer, Safari and Firefox. Each API request 30 can include a command (e.g. POST, PUT, DELETE and GET) and an URL (with HTTP verb) targeted to a specific resource.

A resource group may be the group or category that a particular API call is classified to wherein one or more functionalities applicable to a specific API provider may be applied to the API call based on the classification. API services module 28 may utilize a classification module 32 to match the consumer request 20 with a specific resource group. The classification module 32 may map the API request 30 to an n-ary tree and may execute each node of the tree when determining which API group(s) matches the URL of the API request. In other embodiments, besides determining the resource groups matched a specific URL, the classification module 32 via a configuration tree may also use the provided additional request attributes pertaining to the matched category such as request parameters, headers, body content and the like. As classification module 32 executes the nodes of the tree, policies 36 (i.e. functionalities applicable to a specific API provider plus functionalities applicable to a resource group an API request belong/mapped to) may be determined based on the ascertained categories of the nodes and said policies 36 may be applied to the API request 30. After performing the applicable policies, the appropriate request is sent to the API provider and a corresponding response 38 may be returned to the API consumer 20 to one or more computing devices. In a preferred embodiment, classification module 32 may further include a storage unit for storing commands of the consumer request 30 as well as response data 38 from API provider 38 to API services module 28.

Classification module 32 may map request 30 to an n-ary tree structure wherein the tree is an abstract representation of a combination of resource path and HTTP verb written in programming language. Each node of the tree configuration may represent a segment of a resource path or resource path itself for the node and may include an HTTP verb for that node, and one or more resource categories i.e. groups corresponding to the HTTP verb for the node. Traversal of the tree configuration may parse segments of the request URL in order to reach the node of the tree which is mapped to the URL which represents the resource.

Each segment of the request may be constrained by a path delimitation such as a "/" or ",". For example, an incoming request GET foo.com/v1/books/harrypotter/reviews may be traversed in a tree configuration having four or more or less number of nodes. Assuming tree have at least 4 nodes matching to an incoming request segment, one node which represents the root "foo.com/v1" i.e. base URL, one node which represents "books", one node which represents "harrypotter" and one node which represents "reviews" which may or may not be the leaf node of the tree. Each node in the tree configuration may include a matching API category, i.e. resource group(s) matching to the HTTP method GET for that node and additional request attributes pertaining to the matched category such as request parameters, headers, body content and the like. When a match is attained at a node of the tree configuration for either resource path or API resource group, a record of the request, path and resource group information corresponding to the HTTP method GET can be placed in a memory storage unit. For example, based on the received request GET foo.com/v1/books/harrypotter/reviews, the record may be stored as:

stack 0 w {foo.com/v1};
stack 1 x {books}; a g1, g2
stack 2 y {harrypotter}; b: g1
stack 3 z {reviews}; c: g4 where variables w, x, y, and z store the path information and variables a, b, and c store the grouping categories and/or other request parameters corresponding to HTTP method GET in memory.

It should be appreciated that while system 10 illustrates a REST API configuration, the practice for recourse path and API category matching can be utilized outside the REST protocol. Namely, other URL addressable resource based protocols, such as SOAP API for exchanging XML, can be identified and transformed by classification module 32 along with other resource related attributes. A REST API configuration merely characterizes a possible implementation for the tree configuration based on API classification techniques expressed herein. In addition, a REST resource need not be limited to only responding to POST, PUT, GET, DELETE instructions, e.g. REST fundamental instructions. Therefore, any URL addressable resource may be considered an API REST resource for implementation of system 10.

The network 16 may include any appropriate network, including an intranet, the Internet, cellular network, a local area network or any other such network or combination thereof. Components used for such a system can depend at least in part upon the type of network and/or environment selected. The network 16 may include data paths necessary for communications to be exchanged among computing device components and between integrated device components and peripheral devices. Communication over the network 16 can be enabled by wired or wireless connections, and combinations thereof. The network 16 can include any hardware and software necessary to communicate digital content encoded within carrier waves. The content can be contained within analog or digital signals and conveyed through data or voice channels.

Figure 3:
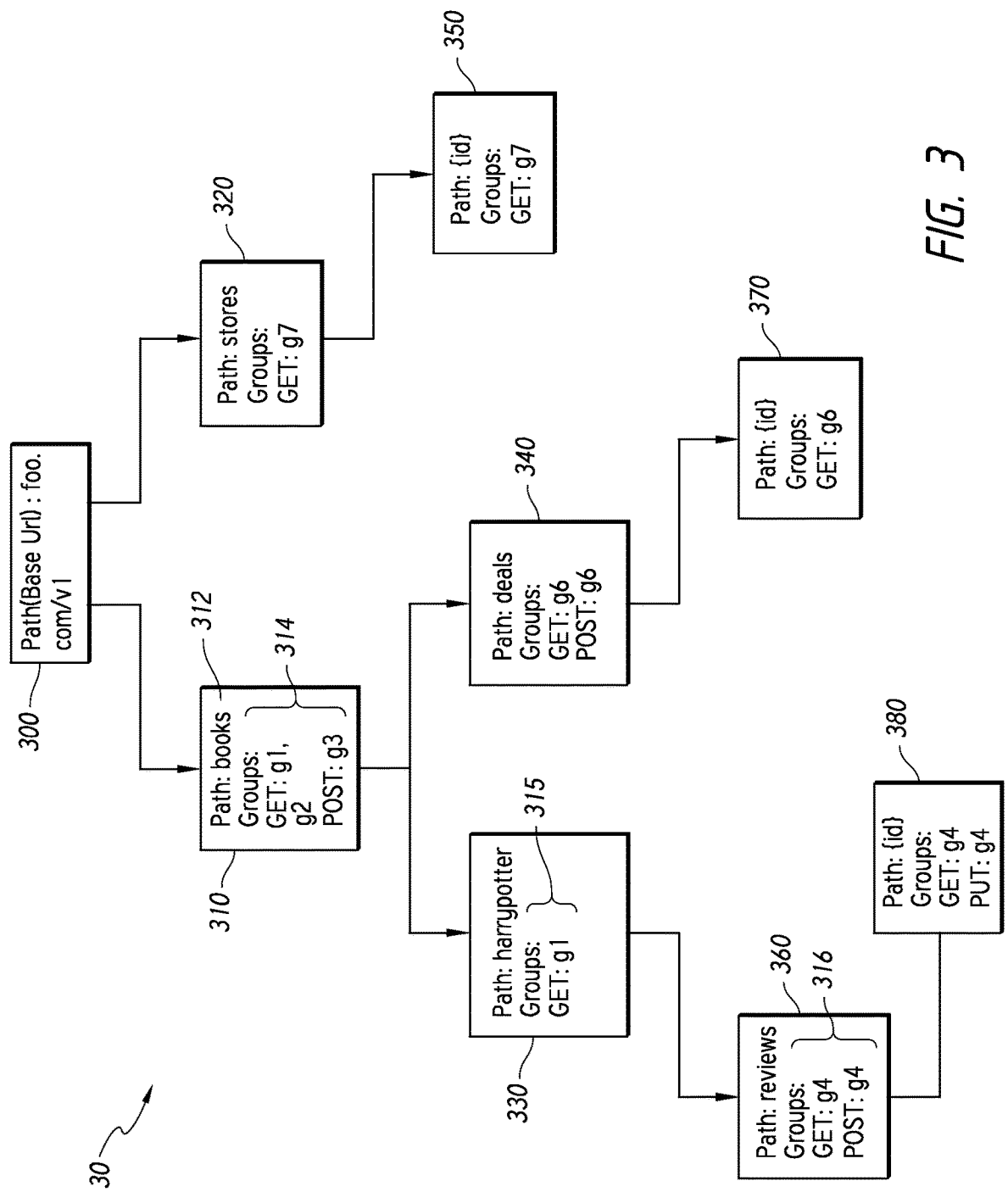
FIG. 3 illustrates a diagram of the tree configuration including a plurality of nodes, each node representing a URL segment, out of which, few nodes having zero or more resource groups, represents a resource path according to an illustrative embodiment of the invention.

Database 12 may include one or more magnetic disks, tape drives, disk drives or other mass storage for storing data and instructions for use by system 10 in a computer system. At least one component of the database 12, preferably in the form of a disk drive or tape drive, stores the information used for processing the system 10. The database may also include one or more drives for various portable media, such as a floppy disk, a compact disc read and write memory, or an integrated circuit non-volatile memory adapter (i.e. PC-MCIA adapter) to input and output data and code to and from a computer readable media. In one embodiment, the database includes a plurality of storage devices or media that are interconnected via a communications network. The plurality of storage media may interact such that the storage media function as a virtual mass storage system. One or more of the plurality of storage media may reside in separate locations while being interconnected electronically, FIG. 3 illustrates a diagram of the tree configuration 300 including a plurality of nodes, each node represents a URL segment and it may map to a resource path e.g. node 312 having one or more API resource groups 314 in accordance with one embodiment of the present invention. As shown, the tree configuration includes a set of connected nodes represented by rectangles 300-380, wherein each node represents a conceivable URL segment. The transition from one node to another node is illustrated by the line and down arrow connecting the nodes. In addition, each node may include a target look up table (LUT) that may be able to determine the next node for a current node of the tree configuration when the current node is a parent of the next targeted node. In such a configuration, a generated function for a URL portion of the node can be an input value for each dimension of the LUT. For example, a LUT of node 300 (e.g. base node foo.com/v1) may identify node 310 (e.g. URL portion "books") and node 320 (e.g. URL portion "stores"). Therefore, the LUT may include a function A corresponding to the URL portion "foo.com/v1" that maps a traversal from node 300 to node 310 and a function B corresponding to the URL portion "foo.com/v1" that maps a traversal from node 300 to node 320. Similarly, for example node 320 may include a resource path value, a resource grouping, and a LUT where the table includes one or more mapping functions associated with URL portion "{id}" (node 350).

With respect to FIG. 3, a traversal of tree configuration for an incoming request 30 such as GET "foo.com/v1/books/harrypotter/reviews" may be explained below. A first step to retrieve a set of resource path values and classification grouping associated with the incoming request involves initializing the present node to root node 300, which is linked to base URL "foo.com/v1." The tree may be initialized in the pre-loading or lazy loading fashion from classification information unit 26. Preloading a tree may arise before API services unit 28 starts interfacing API requests i.e. tree is loaded and is populated in advance. Lazy loading may arise when a first API request lands on API services unit 28, thereby initializing the tree. Next, a mapping function is generated based on the first portion of the URL associated with node 300 ("foo.com/v1"). The generated function is then looked up within an LUT and is matched with targeted node 310 for a URL portion of "books". Thus, "books" is the next node to be traversed in the tree.

The tree configuration 30 may simultaneously process a target node to traverse to and set of resource paths and classification groups for a current node as the operations may be independent of one another or, at first, it may process set of resource paths and classification groups for a current node, and after that, may process a target node to transfer to. Therefore, while the targeted node 310 from node 300 is being determined, one or more additional targeted nodes such as node 320 with resource path and classification grouping applicable for the incoming URL request may also be determined. But finally, only one node matching to the next URL segment may be evaluated and set as the next current node to be traversed to i.e. in this case, out of the node 310 and the node 320, the node 310 is set as the next node to be traversed to. When a path resource or classification grouping is matched to a particular node, a record of the request, path and resource group information may be added to a memory storage unit of system 10. If the matching path resource is not found in the child nodes, and one of the child nodes contains "wildcard", then the node containing "wildcard" is set to as the node to be processed next. In certain embodiments, only one of the child nodes will be matched and not more than one. If the path resource is not found in the child nodes and "wildcard" node is also not present in the child nodes, then it signifies that the tree does not contain a matching node, and a further parsing/matching may stop, and the result of resource groups collected/saved till the current node may be returned as a parent match.

Following traversal to the "books" node, a new present node of the traversal process is set to "books" (node 310). Then a mapping function for the next clause of the request URL "harry potter" is processed. An LUT of node 310 may be searched in order to determine a mapping function associated with the clause which indicates that a next node to traverse in the tree is node 330 pertaining to path "harrypotter." Simultaneously, classification groupings that match node 310 ("books") such as GET g1, g2 and POST g3 (refer to 314) may be processed (but in the example in FIG. 3 only GET g1, g2 will be collected and saved and not POST g3).

Next, traversal of the tree 30 may continue, and a new present node of the traversal process may be set to node 330. A mapping function for the next clause of request URL "reviews" may be determined. An LUT of node 330 may be searched in order to determine a mapping function associated with the "reviews" clause which indicates that a next node to traverse in the tree is node 360. Simultaneously, classification groupings that match node 330 ("harry potter") such as GET g1 classification may be processed and the resource group g1 is collected/saved in the result of parent match corresponding to GET.

Traversal of tree 30 may continue, and a new present node of the traversal process may be set to "reviews" (node 360). Since the node matching to the URL segment "reviews" is visited, and no next segment is present in the URL, there is no need to traverse the tree further by searching an LUT of node 360. Current node, 360 is the final exact matched result node. The process then collects and stores the groups information corresponding to HTTP method GET, i.e. g4 316, as the "exact match", and returns the results collected and stored i.e. exact match→g4 and parent matches→g1, g2.

As explained in the preceding paragraph, there is no need to traverse or visit node 380 which may or may not be a leaf/terminating node of the tree. At this juncture, the tree structure has been traversed to yield a set of resource paths and matching classification groups associated with those paths, which may be stored as one or more records in API services 28.

The API services unit 28 of the API platform 22 may use these stored records i.e. collected results to perform further operations such as application of one or more policies 36 (functionalities applicable to a specific API provider plus policies applicable to the collected exact matched resource groups) to the API request. The policies 36 that may be applied may include one or more traffic management policies, security policies, mediation policies, extension policies, and policy schemas. Traffic management policies may include policies which allow the user to configure cache, control traffic quotas and spikes and set concurrent rate limits. Security policies may include threat protection features such as user access control and API key validations for specific APIs. Mediation policies may include message transformation, parsing, validation, and raise faults and alerts. Extension policies may include custom created policy i.e. functionality beyond what is provided by the API platform 22 such as a service callout, message data collection, and calling Java, JavaScript and Python behavior created by the user. Lastly, policy schemas which may be provided from a third party source or may be configured by the organization admin of API/service provider may include a full set of elements and attributes available for policy configuration.

Similarly, analytics services 24 may use the classification module 34 to classify an API request to groups relevant to analytics. Resource groups found by traversing classification module 34 may be used in the analytics services 24 in different use cases. One use case could include keeping track of various URL patterns that the API provider may be interested in from the matched parent groups. e.g. If a user is interested in foo.com/v1/books/harrypotter/reviews, then he may be interested in foo.com/v1/books/harrypotter, and thus he may be interested in purchasing the book "harrypotter."

Figure 4:
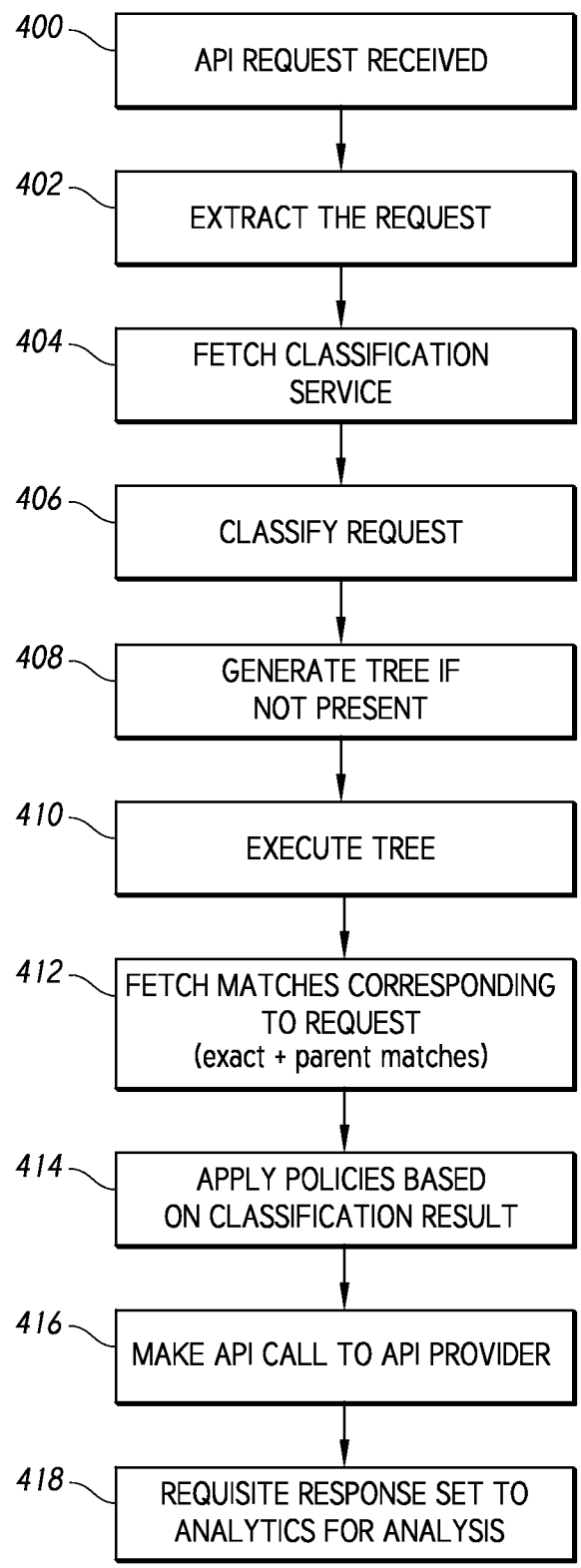
FIG. 4 illustrates a flow chart describing a method of interaction between one or more entities of the API processing system during classification of API requests according to an illustrative embodiment of the invention.

FIG. 4 is a flow chart describing a process of interaction between one or more entities of the API processing system 10 during classification of API requests according to an illustrative embodiment of the invention. The process may begin in step 400 where an API request is received at API Services module 28. The request may include an API language of HTTP implementation. In step 402, a URL path and HTTP verb may be extracted from the request, which distinctively identifies an API resource and the extracted information is stored in memory storage. During step 402, the URL path may also be partitioned into fragments in order to obtain path and grouping information for each fragment. For example, the extracted request such as GET foo.com/v1/books/harrypotter/reviews may be separated into segments such as foo.com/v1, books, harrypotter, reviews.

Once the request is extracted, next in step 404 a gateway component (i.e. API services 28) of the API platform 22 may send a request to the repository service component 26, for initializing classification module 32, or initialization might have already been done in the pre-loading-populating fashion. The gateway component may be a policy control point for communicating with other components of the system 10 including developer channel 20, analytics services 24, GUI 18, application services 14 and the like. Classification module may then send a response to gateway component that the initiation request has been received. Once the gateway component receives the response, the gateway component may send a classification message to classify the extracted request to classification service in step 406. The classification request may include identifying information of the extracted request such as developer/organization id, proxy name id as well as the resource path URL and HTTP verb (e.g. POST, PUT, DELETE and GET).

Next in step 408 the classification services component in classification module 32 determines if a tree configuration is present. If the classification tree is not present, the tree may be built in step 408 once the API request arrives in step 406. The classification tree may be built via classification module 32 sending one or more requests for receiving API models and API groups to an API repository service 26. The repository service 26 may be an infrastructure service of the API ecosystem 10 including a database of API models and groups pertaining to one or more developers/organizations managed by a management server or analytics server. Once the classification services unit receives one or more responses from the repository service acknowledging reception of the requests and existence of the API models and groups, the classification service may send a command to a classification tree unit of classification module 32 to create a tree with nodes corresponding API Models and API Resource Groups. Once the tree corresponding to API Models and API Resource Groups is built, the classification tree component will then send an acknowledgement back to the classification services component of the classification module 32. At this point, classification of the API request may move to step 410 with execution of the tree. It should be noted that if it is determined that the corresponding tree structure was previously generated then the process will automatically move from step 406 to step 410.

In step 410, the tree may be executed with a classification service unit of classification module 32 after reception of the classification request from the API service component 28. The classification service unit will fetch the tree configuration pertaining to the organization name and/or proxy name found in the classification request. Once the tree configuration is fetched, in step 412 the classification service unit may traverse the configured tree in order to match the URL path and the HTTP verb of the API request with the appropriate grouping/classification information found in the nodes of the tree as illustrated in the example in FIG. 3. The classification tree may return both "exact" and "parent" matches of classification to the classification module 32. Exact matches may be grouping/classification information and/or additional request attributes pertaining to the specific requested node. For example, the GET/books/harrypotter/reviews request in FIG. 3 would return an exact match result of g4. Parent matches of classification represent grouping/classification information pertaining any of the traversed nodes on the path to the specific requested node. For example, in FIG. 3, fetching exact match g4 executes a traversal of nodes books (node 310), harrypotter (node 330), and reviews (360) resulting in parent matches of g1 and g2. Classification in step 412 may yield only exact matches or only parent matches or both or neither.

After exact and/or parent matches are received from classification module 32, in step 414, one or more policies 36 (different functionalities applicable to a specific provider/developer plus policies applicable to obtained resource groups from the classification module) based on determined classification information of the API call may be applied. Policies 36 may include one or more traffic management policies, security policies, mediation policies, extension policies, and/or developer or service provider created schemas. Policies that are applied may be service provider specific including those performing transformations, filtering, added security, execute conditional logic or custom code, and the like. In addition, developers may create policies for adding information, such as headers and query parameters to the extracted API information from the nodes. Following application of the policies, the resultant API call may be made to one or more API providers in step 416.

In step 418, the API request, request's response sent by the API provider may be sent to the analytics system 24 for further analysis. In step 418, analytics services 24 may again use classification tree cache 34 initialized and populated with analytics specific groups, to quickly fetch the classification information (pertaining to an analytics component specific API group(s) stored in classification cache 34 in order to decipher the appropriate analytics processing of the received API call such as analyzing API traffic and/or automatic API correction. Thus, by utilizing the classification tree, the API platform 22 may classify a call for further analysis without requiring direct communication and search through database 12 for each API request 30 received. Under algorithm 30, performance of the classification operation is improved to a worse case time complexity=height of the tree=number of resource path segments for resource with the most path segments. Without algorithm 30, performance may be as much as m*n time complexity wherein m is the number of groups and n is the number of group lists for each API group for searching through the groups for the API call. Therefore, process 40 would offer an extreme improvement of efficiency for classifying API calls to a specific group or category.

While exemplary embodiments of the invention have been described in connection with various computing devices and network architectures, the underlying concepts may be applied to any computing device or system in which it is desirable to implement a method for collecting and reporting API performance entities. Thus, the methods and systems described in connection with embodiments of the present invention may be applied to a variety of applications and devices. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent systems and methods achieved by embodiments of the invention.

The various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. While aspects of the present invention has been described in connection with the preferred embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Therefore, the claimed invention should not be limited to any single embodiment, but rather should be construed in breadth and scope in accordance with the appended claims.

I claim:
1. A method comprising:
receiving an API request;
extracting from the API request a particular URL path and a particular HTTP verb that identify an API resource;
generating a classification tree that includes nodes, where each node corresponds to both a respective portion of URL paths and a respective API resource group that corresponds to a respective HTTP verb, each node including a look up table that identifies the next node of a current node of the tree;

determining respective policies that correspond to the respective API resource groups of the nodes based on respective API categories of the nodes;

traversing the classification tree to match portions of the particular URL path and the particular HTTP verb of the API request with both the respective portions of the URL paths and the respective API resource groups that correspond to respective HTTP verbs of a set of nodes of the classification tree; and for each of the nodes in the set of nodes that were traversed:

identifying a policy of the respective policies based on the respective API resource groups that correspond to the particular HTTP verb of that node; and applying, to the API request, the policy that was identified that corresponds to the respective API resource groups that correspond to the particular HTTP verb of that node; and after the policies are applied to the API request, providing the API request to an API provider.

2. The method of claim 1, wherein the policies comprise one or more of: traffic management policies, security policies, mediation policies, extension policies, developer created schemas, or service provider created schemas.

3. The method of claim 1, comprising:
sending a response to the API request sent by the API provider to an analytics system.

4. The method of claim 1, wherein traversing the classification tree comprises navigating from a root node to a terminal node via one or more non-terminal nodes along a resource path.

5. The method of claim 1, wherein traversing the classification tree comprises determining at least one mapping function for navigation between nodes of the tree, the mapping function being determined based on the URL path.

6. The method of claim 1, wherein for each of the nodes that were traversed, executing the node comprises:
identifying a first API resource group that corresponds to a HTTP verb of a first node that was traversed;
identifying a first policy that corresponds to the first API resource group that was identified;
identifying a second API resource group that corresponds to a HTTP verb of a second node that was traversed;
identifying a second policy that corresponds to the second API resource group that was identified;
applying the first policy that was identified and the second policy that was identified to the API request; and
after applying the first policy and the second policy to the API request, providing the API request to an API provider.

7. The method of claim 1, wherein the look up table includes a function corresponding to the respective URL portion of URL paths that maps a traversal from a first node to a second node.

8. A system comprising:
one or more computers; and
one or more storage devices storing instructions that are operable, when executed by the one or more computers, to cause the one or more computers to perform operations comprising:
receiving an API request;
extracting from the API request a particular URL path and a particular HTTP verb that identify an API resource;
generating a classification tree that includes nodes, where each node corresponds to both a respective portion of URL paths and a respective API resource group that corresponds to a respective HTTP verb, each node including a look up table that identifies the next node of a current node of the classification tree;

determining respective policies that correspond to the respective API resource groups of the nodes based on respective API categories of the nodes;

traversing the classification tree to match portions of the particular URL path and the particular HTTP verb of the API request with both the respective portions of the URL paths and the respective API resource groups that correspond to respective HTTP verbs of a set of nodes of the classification tree;

for each of the nodes in the set of nodes that were traversed:

identifying a policy of the respective policies based on the respective API resource groups that correspond to the particular HTTP verb of that node; and applying, to the API request, the policy that corresponds to the respective API resource groups that correspond to the particular HTTP verb of that node; and after the policies are applied to the API request, providing the API request to an API provider.

9. The system of claim 8, wherein the policies comprise one or more of: traffic management policies, security policies, mediation policies, extension policies, developer created schemas, or service provider created schemas.

10. The system of claim 8, the operations comprising:
sending a response to the API request sent by the API provider to an analytics system.

11. The system of claim 8, wherein traversing the classification tree comprises navigating from a root node to a terminal node via one or more non-terminal nodes along a resource path.

12. The system of claim 8, wherein traversing the classification tree comprises determining at least one mapping function for navigation between nodes of the tree, the mapping function being determined based on the URL path.

13. The system of claim 8, wherein the look up table includes a function corresponding to the respective URL portion of URL paths that maps a traversal from a first node to a second node.

14. A non-transitory computer-readable storage device storing instructions executable by one or more computers which, upon such execution, cause the one or more computers to perform operations comprising:
receiving an API request;
extracting from the API request a particular URL path and a particular HTTP verb that identify an API resource;
generating a classification tree that includes nodes, where each node corresponds to both a respective portion of URL paths and a respective API resource group that corresponds to a respective HTTP verb, each node including a look up table that identifies the next node of a current node of the tree;

determining respective policies that correspond to the respective API resource groups of the nodes based on respective API categories of the nodes;

traversing the classification tree to match portions of the particular URL path and the particular HTTP verb of the API request with both the respective portions of the URL paths and the respective API resource groups that correspond to respective HTTP verbs of a set of nodes of the classification tree;

for each of the nodes in the set of nodes that were traversed:
- identifying a policy of the respective policies based on the respective API resource groups that correspond to the particular HTTP verb of that node; and,
- applying, to the API request, the policy that was identified that corresponds to the respective API resource groups that correspond to the particular HTTP verb of that node; and after the policies are applied to the API request, providing the API request to an API provider.

15. The non-transitory computer-readable storage device of claim 14, wherein the policies comprise one or more of: traffic management policies, security policies, mediation policies, extension policies, developer created schemas, or service provider created schemas.

16. The non-transitory computer-readable storage device of claim 14, the operations comprising:

sending a response to the API request sent by the API provider to an analytics system.

17. The non-transitory computer-readable storage device of claim 14, wherein traversing the classification tree comprises:

navigating from a root node to a terminal node via one or more non-terminal nodes along a resource path; and determining at least one mapping function for navigation between nodes of the tree, the mapping function being determined based on the URL path.

18. The non-transitory computer-readable storage device of claim 14, wherein the look up table includes a function corresponding to the respective URL portion of URL paths that maps a traversal from a first node to a second node.

* * * * *